United States Patent Office 3,310,904
Patented Mar. 28, 1967

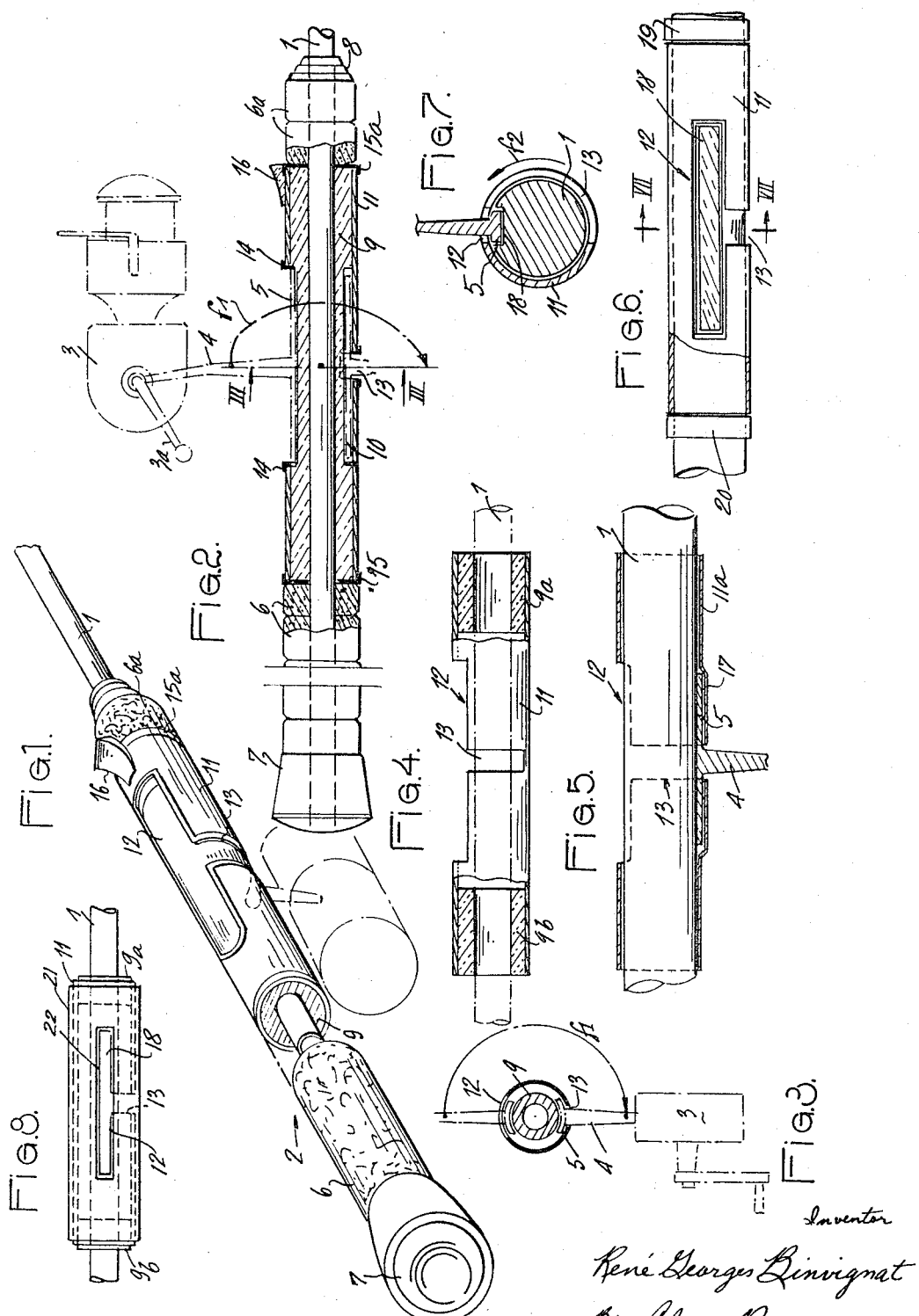

3,310,904
DEVICE FOR FASTENING A REEL ON A FISHING-ROD AND FISHING-ROD PROVIDED WITH THIS DEVICE
René Georges Binvignat, 41 Ave. de Suffren, Paris, France
Filed Feb. 17, 1965, Ser. No. 433,391
Claims priority, application France, Feb. 25, 1964, 965,114, Patent 1,409,246
11 Claims. (Cl. 43—22)

As the fishermen are well aware, the reel to be mounted on a fishing-rod must be designed so that it may be put in place and removed in an easy manner. In other respects, said reel must not interfere with any use of the fishing-rod when the reel is in position and the manipulation thereof must be as easy as possible.

All the reels include an elongated lug which is intended to maintain the latter at some distance from the part constituting the fishing-rod handle, and the end of said lug is integral with a fastening sole-plate which is intended to bear against said part constituting the fishing-rod handle.

In order to maintain said fastening sole-plate, the fishing-rods are generally provided with sliding rings which are slid on the ends of the fastening sole-plate. Sometimes these rings are replaced by a screw arrangement which is a part integral with the fishing-rod handle. Said rings do not insure a good fastening of the reel. Moreover, they form projections which avoid a flexible and delicate holding of the fishing-rod in the fisherman's hand. The screw arrangements have the same drawback so far as the protuberance formed thereby is concerned. In addition, they are costly and may easily become oxidized, particularly when the rod is used for fishing at sea.

The present invention eliminates the above-mentioned drawbacks in providing a new reel fastening device on a fishing-rod, and also it includes fishing-rods provided with said device.

According to this invention, said device comprises a sheath fitted on that part which constitutes the handle of a fishing-rod, said sheath having a longitudinal aperture the shape and dimensions of which correspond to the shape and dimensions of the fastening sole-plate of a reel, said aperture communicating with a transverse slot extending over an angular spread of about 180°, said slot registering with the position assumed by a lug connecting the body of the reel to the fastening sole-plate thereof.

Various other features and advantages will be revealed when reading the following detailed description, with reference to the annexed drawing representing in an illustrative and by no means limitative manner some embodiments of this invention, and in which:

FIGURE 1 is a view in perspective, with parts broken away, showing the handle of a fishing-rod according to this invention.

FIGURE 2 is a longitudinal view partly in elevation and partly in section illustrating the invention in detail.

FIGURE 3 is a section taken along the line III—III in FIG. 2.

FIGURE 4 is a fragmentary view partly in elevation and partly in section illustrating an alternative embodiment of this invention.

FIGURE 5 is a fragmentary view partly in elevation and partly in section of another alternative embodiment.

FIGURE 6 is a fragmentary elevation, with broken parts, of still another embodiment.

FIGURE 7 is a cross-section taken along the line VII—VII in FIG. 6.

FIGURE 8 is a fragmentary elevation similar to FIG. 6, showing a modification of the embodiment according to the alternative form represented in FIG. 6.

Turning now to the drawing, in the embodiment shown in FIGS. 1 to 3, the reference number 1 designates a fishing-rod and 2 the handle assembly of said fishing-rod, to which is to be fastened in a removable manner a reel 3 which includes a supporting lug 4 used to connect the reel body proper to a fastening sole-plate member 5 having a generally rectangular shape, while the underside of the latter is mostly given the contour of a cylindrical segment whereby to substantially match the external part of the fishing-rod handle, which is of course cylindrical.

To grip easily said handle as well as to give a light weight thereto, whereby the whole of the rod is as light in weight as possible, it is a common practice in the art to constitute the handle by means of a stack of washers 6 made from cork or plastic material, a plug 7, e.g. made from rubber, being moreover disposed at the end of the rod, while a stop ferrule 8 is provided at the other end of the handle.

In the embodiments shown in FIGS. 1 to 3, the fishing-rod 1 supports, in addition to the two sets of washers 6 and 6a constituting the handle 2, a sleeve 9, for example made from cellular rubber, or cork, or plastic material, or any material deemed to be suitable for being used therefor. Said sleeve is smaller in diameter than the washers 6 and it includes in the central part thereof a cut-out portion 10 having a length at least equal to the greatest length of the fastening sole-plates 5 of the reels usually commercially sold. The depth of the cut-out portion 10 substantially corresponds also to the thickness of the fastening sole-plate 5.

The parts of sleeve 9 which have the greatest diameter are used to support a sheath 11 made from a plastic material, which may be, if desired, reinforced by a reinforcing member, made for example from glass fibers or any other material. As most clearly shown in FIG. 1, said sheath 11 is provided with a longitudinal aperture 12 the length of which approximately corresponds to that of the recited cut-out portion 10, and a slot 13 extends at right angles therefrom along an angular spread of about 180°. Sheath 11 is made fast to sleeve 9 and thus to the whole of handle 2, for example, by gluing the sheath on said sleeve which is in turn glued on the fishing-rod.

Although this being not necessary in all cases, it is advantageous, as shown by the drawing, to edge the aperture 12 and the slot 13 with a peripheral band 14 which may be made from a metal; washers 15 and 15a, also made from a metal may cover the ends of sheath 11, if this is deemed necessary or at least desirable.

It has been found advantageous, still according to the present invention, to align the aperture 12 in the sheath 11, with a bearing stop member 16 preferably resilient which is made either from the material constituting said sheath 11 or a different material.

To position the reel 3, all that is necessary is to introduce its fastening sole-plate 5 into the aperture 12 and then to cause the body of the reel to rotate 180° in the direction of the arrow $f_1$ as shown in FIG. 3. In this manner, the fastening sole-plate 5 of said reel comes to a position which is diametrically opposite to that of the aperture 12 and thus sole-plate 5 is properly locked, while the reel is put in a position which suits the fisherman. That is, the reel is under the fishing-rod when the latter is held in his right hand and when the user holds the fishing-rod while pressing his thumb on the stop 16, this corresponding to a balancing position of the rod in the right hand, the lug 4 of the reel extends in such a case between the third and fourth fingers of the right hand and the reel is easily operable by the fisherman's left hand rotating the crank 3a thereof.

It should be noted that the same reel fastening device may be used for left-handed fishermen. In effect, it suffices in such a case to mount the sheath 11 according to a reverse arrangement whereby the operating crank 3a of reel 3 is disposed on the right side of the fishing-rod when the latter is held in the left hand.

FIGURE 4 shows a first alternative embodiment of the reel fastening device. According to this alternative embodiment, the sleeve 9 in FIGS. 1 to 3 is replaced by two elongated washers or rings 9a and 9b the inside diameters of which correspond to the outside diameter of the fishing-rod 1. The sheath 11 is applied in the same manner as above-described.

The advantage of this arrangement resides in that it becomes possible to provide sheath 11 with washer 9a, 9b units adaptable to different kinds of fishing-rods which do not include a handle such as the one previously described with reference to FIGS. 1 to 3.

The embodiment shown in FIG. 4 may also be used on different fishing-rods, the reel fastening device simultaneously constituting the handle thereof.

There is shown in FIG. 5 another alternative embodiment whereby the washers 9a and 9b are eliminated. In effect, in such a case, the sheath designated 11a is made, for example, by a moulding operation from a flexible and resilient material, whereby said sheath may be directly telescoped or slid onto the fishing-rod 1.

If the sheath is made by means of a moulding process, it is advantageous that its part bordering the slot 13 which opens into the aperture 12 be slightly preshaped whereby to define, between the wall of the fishing-rod 1 and the internal wall thereof, a channel 17 having a thickness slightly less than that of the reel fastening sole-plate 5, this facilitating the positioning of the sole-plate 5, although a resilient force is exerted by the preshaped part whereby to insure a good holding in place of said reel.

FIGURES 6 and 7 show still another embodiment wherein there is provided a longitudinal groove 18 in the wall of the fishing-rod, the depth of said groove substantially corresponding to the thickness of the reel fastening sole-plate 5. In the present case, the sheath 11, applied as hereinbefore described with reference to FIGS. 1 to 3, is directly slid onto the fishing-rod 1, but through a gentle friction, whereby said sheath can be rotated around the fishing-rod in the direction of the arrow $f_2$.

In order to avoid any axial displacement of sheath 11, two washers 19, 20, respectively, are advantageously disposed on either side of the latter, said washers being, e.g. glued, to the fishing-rod or merely forcibly slid onto the latter, thus acting as stop members.

FIGURE 8 shows a slight alternative embodiment wherein some elements of the above-mentioned embodiments are present. In effect, as represented in said figure, the fishing-rod 1 is provided with a sheath 11, which may be made from a plastic material or any other suitable material, said sheath including the afore-mentioned described aperture 12 and transverse slot 13.

Sheath 11 is mounted on wedge members, such as the wedging washers 9a and 9b in FIG. 4, and is made fast to the fishing-rod 1. A sleeve 21, having an aperture 22 corresponding to the recited aperture 12, is slid onto sheath 11, and it can be rotated around said sheath after the positioning of the reel with the sole-plate initially engaged in the apertures 12 and 22, so as to pass under the sheath 11 when the whole reel is rotated together with sleeve 21 in the manner represented in FIG. 3.

I claim:

1. A device for fastening a reel on a fishing-rod, characterized in that said device comprises a sheath having a circular cross-section and mounted on that part of a fishing-rod constituting the handle of the latter, and having a longitudinally extending aperture therethrough of which the shape, length and width correspond to the shape, length and width of the fastening sole-plate of said reel, said aperture communicating at a medial portion of one side thereof with a transverse slot extending through said sheath, said slot extending along an angular spread of about 180° from said aperture, said slot defining an arcuate path and adapted to receive a lug connecting the body of said reel to the fastening sole-plate of the latter and permitting the lug to rotate relatively to the end of the slot.

2. A device according to claim 1 characterized in that the sheath is disposed in a fixed manner on said handle, the aperture being disposed in a position diametrically opposite to the position that the reel fastening sole-plate assumes when said reel is in an operative position.

3. A device according to claim 1, characterized in that said sheath is mounted rotatably relative to said part.

4. A device according to claim 1, characterized in that the handle comprises a sleeve which is slid onto the fishing-rod and of which the central part is provided with a cut-out portion, the depth of said cut-out portion corresponding to the thickness of the sole-plate fastening said reel, and said sheath being supported by said sleeve.

5. A device according to claim 1, characterized in that the handle comprises two interposed longitudinally spaced washers, said sheath being supported by said washers whereby to connect the sheath to that part of the fishing-rod constituting the handle of the fishing-rod.

6. A device according to claim 1, characterized in that the sheath is made from a flexible resilient material and is directly slid onto said handle.

7. A device according to claim 1, characterized in that the sheath is rotatably mounted on said handle, and said part of the fishing-rod includes a longitudinal groove having a shape and dimensions corresponding to those of said longitudinal aperture, whereby to form a centering recess for the reel fastening sole-plate.

8. A device according to claim 3, characterized in that stop washers are fixedly mounted on said handle on either side of the sheath.

9. A device according to claim 1, characterized in that the handle comprises wedges, the sheath being made fast to the fishing-rod by the wedges and a sleeve, having an elongated aperture corresponding to said longitudinal aperture being rotatably mounted on said sheath.

10. A device according to claim 1, characterized in that the sheath is provided with a projection constituting a bearing member for the fisherman's thumb when the fishing-rod is held in the fisherman's hand in its operative position.

11. A device according to claim 1, characterized in that the sheath forms one of the elements of the handle.

References Cited by the Examiner

UNITED STATES PATENTS 2,793,458  5/1957  Stephens _____ 43—22
2,826,852  3/1958  Wardrip _____ 43—22

ALDRICH F. MEDBERY, Acting Primary Examiner.

SAMUEL KOREN, Examiner.

D. J. LEACH, Assistant Examiner.